United States Patent [19]

Greiner

[11] 3,988,942

[45] Nov. 2, 1976

[54] LAMINATED GEAR

[75] Inventor: Harry M. Greiner, Offenbach, Germany

[73] Assignee: Roland Offsetmaschinenfabrik Faber & Schleicher AG, Germany

[22] Filed: Apr. 28, 1975

[21] Appl. No.: 572,290

[52] U.S. Cl. ................................ 74/445; 29/159.2
[51] Int. Cl.² .................. F16H 55/12; B21D 53/28
[58] Field of Search ...................... 74/445; 29/159.2

[56] References Cited
UNITED STATES PATENTS

| | | | |
|---|---|---|---|
| 1,466,236 | 8/1923 | Kinney | 74/445 |
| 1,871,417 | 8/1932 | Mansur | 74/445 |
| 1,891,937 | 12/1932 | Mansur | 74/445 |
| 1,912,082 | 5/1933 | Lytle | 74/445 |
| 1,981,782 | 11/1934 | D'Aubigne | 74/445 |

Primary Examiner—Leonard H. Gerin
Attorney, Agent, or Firm—Leydig, Voit, Osann, Mayer & Holt, Ltd.

[57] ABSTRACT

A spur gear formed of a laminated stack of axially thin spur gear elements having straight axially extending teeth identical involute tooth profiles and with means for securing them together in coaxial relation with stepped increments of phase between them producing a gear having a helical tooth pattern distinguished by the smoothness and lack of vibration of a helical gear while nevertheless avoiding the end thrust problems and the variations in phase which can occur with helical gearing.

6 Claims, 5 Drawing Figures

U.S. Patent  Nov. 2, 1976  3,988,942
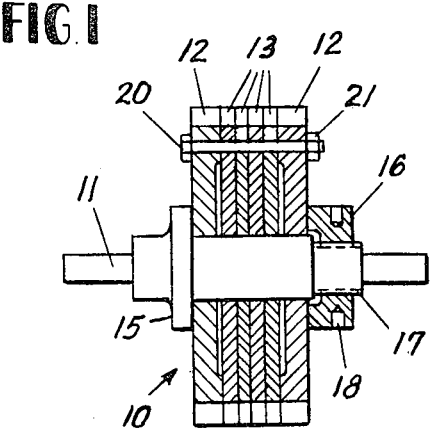
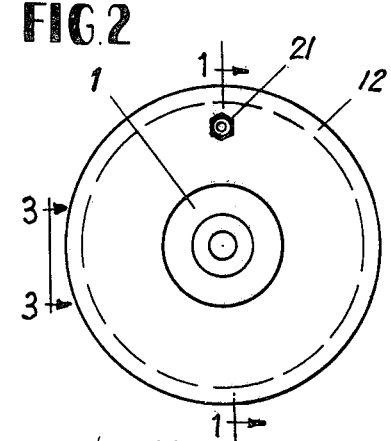
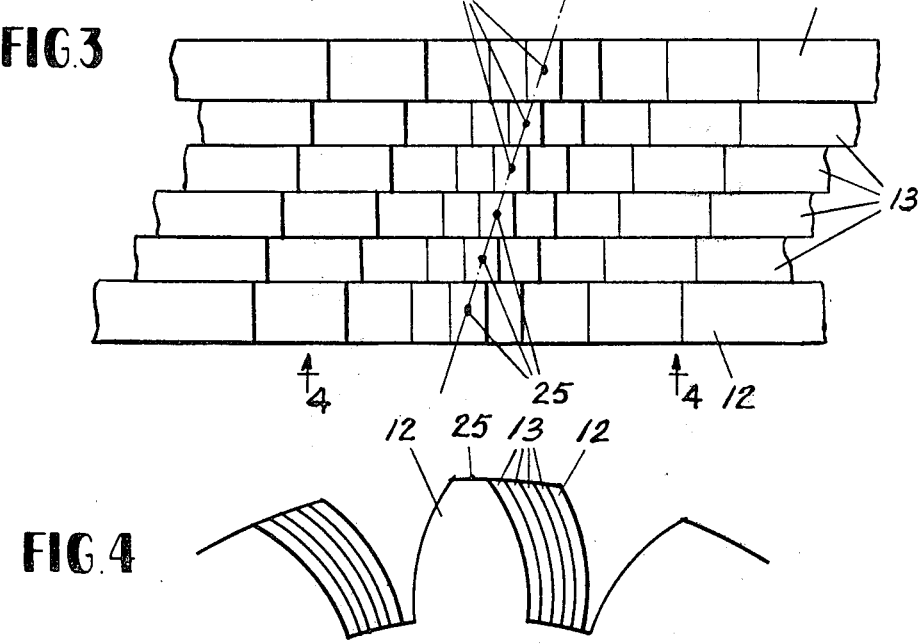
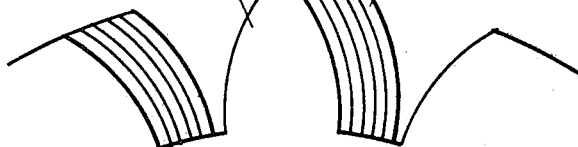
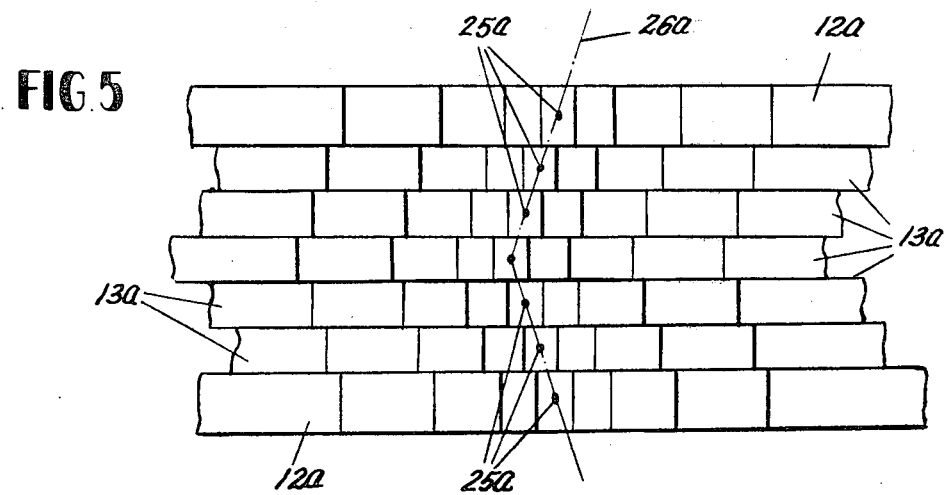

ns in a number of different, separately printed, colors of ink it is necessary to maintain an exact phase relationship between various cylinders and rollers rotating in unison about parallel axes. This has generally necessitated use of spur gears, as contrasted with helical gears, since helical gears are incapable of maintaining predetermined phase relation between an input and output shaft since such phase relation is a function of axial position which in turn depends upon end play and the degree of torque loading.

LAMINATED GEAR

In the printing art, for example in making reproductions in a number of different, separately printed, colors of ink it is necessary to maintain an exact phase relationship between various cylinders and rollers rotating in unison about parallel axes. This has generally necessitated use of spur gears, as contrasted with helical gears, since helical gears are incapable of maintaining predetermined phase relation between an input and output shaft since such phase relation is a function of axial position which in turn depends upon end play and the degree of torque loading.

Thus, to maintain a desired phase relationship between driving and driven shafts, independently of end play, it has been necessary to tolerate certain well known disadvantages in the use of spur gears including noise and vibration, particularly after the gears become somewhat worn.

It is, accordingly, an object to provide a laminated gear made up of a stack of identically profiled involute spur gear elements having straight axially extending teeth, with each element being slightly offset in phase from the next to provide a quiet, vibrationless torque transmitting couple having precise preservation of phase position. It is a general object to provide a laminated gear possessing the phase preservation of spur gears plus the freedom of noise and vibration of helical gears but free of the disadvantages which characterize each of such types of gears.

It is another object of the invention to produce a gear construction which possesses all of the advantages of a herringbone gear but which may be constructed, utilizing simply profiled straight spur elements, without necessity for resorting to the specialized tooth forming machines required to form a helical gear and at a small fraction of the cost.

Other objects and advantages of the invention will be apparent upon reading the attached detailed description and upon reference to the drawing, in which:

FIG. 1 is an axial section taken through a gear constructed in accordance with the invention looking along the line 1—1 in FIG. 2;

FIG. 2 is an end view of the gear shown in FIG. 1;

FIG. 3 is an enlarged fragmentary view showing the offset in phase from one gear element to the next and looking along the line 3—3 in FIG. 2;

FIG. 4 is a fragmentary profile view of the gear looking along the line 4—4 in FIG. 3; and FIG. 5 shows a modified construction similar to FIG. 3 but with the gear elements offset in a herringbone pattern.

While the invention has been described in connection with certain preferred embodiments, it will be understood that I do not intend to be limited to the particular forms of the invention which have been illustrated but intend, on the contrary, to cover the various alternative and equivalent constructions included within the spirit and scope of the appended claims.

Turning now to FIGS. 1 and 2, there is shown a laminated, or composite, gear 10 mounted upon a shaft 11. The gear is formed of a stack of axially thin, identically profiled spur gear elements having straight axially extending teeth including elements 12 in the end positions sandwiching elements 13 between them. The elements 12 are preferably thicker and stronger than the elements 13 and means are provided for applying clamping pressure to the end elements to hold the stack tightly together with the elements in predetermined relative phase positions.

Referring to FIG. 1, the gear elements are clamped together and secured to the shaft 11 by forming a shoulder 15 on the shaft opposed by a nut 16 which engages a thread 17. For tightening the nut it is formed with capstan openings 18 for insertion of a turning tool. To further insure maintenance of predetermined phase positions of the gear elements, they may be provided with registering openings into which a bolt 20 is inserted having a nut 21.

Where bolts 20 are used, preferably spaced at equal intervals, to clamp the stack tightly together, the shoulder 15 and nut 16 on the shaft may be dispensed with and the laminations may be key-slotted for force transmission in the manner of a gear of conventional type.

In carrying out the present invention, reference points on each of the gear elements are offset by incremental amounts so that such reference points, shown at 25 in FIG. 3, lie along a helical locus 26.

In the preferred form of the invention, the increments of angular phasing between adjacent gear elements are substantially equal to 360°/nt, where $n$ is the number of laminations and $t$ is the number of teeth. This distributes the gear elements so that the action thereof is spread evenly and symmetrically over each tooth sector and hence throughout a complete cycle of rotation of the gear.

In the simplest form of the invention, the gear elements are angularly offset from one another by substantially equal amounts in the same direction. However, the laminated gear may be constructed as illustrated in FIG. 5 in which corresponding elements are indicated by corresponding reference numerals with addition of subscript $a$. In this modification, the incremental angular offset of the reference points 25a is in opposite directions on each side of the center of the gear to provide a chevron shaped locus resulting in a "herringbone" pattern of straight axially extending gear teeth, as indicated at 26a.

It will be appreciated by one skilled in the art that the construction described above, in either of its modifications, possesses the inherent advantages of spur gears and helical gears but without the disadvantages of either. When such a gear is employed in exacting applications, such as between the cylinders of a printing press where precise maintenance phase is necessary to produce accurate register in a printed product, the phase is preserved with precision, indeed, a precision exceeding that of a large straight spur gear, particularly where the latter has become slightly worn in use. Noise and vibration are minimized, as in the case of a helical gear, but there is no loss or uncertainty of phasing as there is in the case of a helical gear subject to the usual end play and variations in loading. Nor is there any necessity for absorbing end thrust, which is one of the requirements of a helical gear.

The modification illustrated in FIG. 5, indeed, has all the advantages inherent in a gear of the herringbone type but it may be manufactured using the simplest of profiling equipment and at a cost which is only a small fraction of the cost of a conventional gear of herringbone type.

Machining is economical since each gear element is a conventional straight spur gear having axially straight teeth of involuted construction readily susceptible to mechanized production using simple "profiling" cutters.

I claim as my invention:

1. A spur gear comprising a laminated stack of axially thin identically-profiled spur gear elements having straight axially-extending teeth of involute form and means for securing them flatly together in coaxial relation with stepped increments of angular phasing between them.

2. A spur gear comprising a laminated stack of axially thin identically-profiled spur gear elements having straight axially-extending teeth of involute form and means for securing them flatly together in coaxial relation with equally stepped increments of angular phasing in the same direction between adjacent gear elements.

3. A spur gear comprising a laminated stack of axially thin identically-profiled spur gear elements having straight axially-extending teeth of involute form and means for securing them flatly together in coaxial relation with incremental steps of angular offset in opposite directions on each side of center in a herringbone pattern.

4. The combination as claimed in claim 1 in which the increments of angular phasing are substantially equal to 360°/nt where $n$ is the number of laminations and $t$ is the number of teeth so that the action of gear elements is spread evenly and symmetrically over each tooth sector.

5. The combination as claimed in claim 1 in which the gear elements at the end of the stack are thicker than the remaining elements, and means for applying inward clamping pressure to the end elements for keeping all of the elements clamped tightly together in predetermined relative phase positions.

6. The combination as claimed in claim 1 in which the gear elements are provided with at least one set of registering openings adjacent the periphery, the openings being engaged by a clamping bolt.

* * * * *